US009556055B2

(12) United States Patent
Likitvanichkul et al.

(10) Patent No.: US 9,556,055 B2
(45) Date of Patent: Jan. 31, 2017

(54) METHOD FOR REDUCING GLASS-CERAMIC SURFACE ADHESION, AND PRE-FORM FOR THE SAME

(71) Applicant: Corning Incorporated, Corning, NY (US)

(72) Inventors: Sumalee Likitvanichkul, Painted Post, NY (US); William Edward Lock, Horseheads, NY (US); Sophie Peschiera, Veneux les Sablons (FR)

(73) Assignee: Corning Incorporated, Corning, NY (US)

( * ) Notice: Subject to any disclaimer, the term of this patent is extended or adjusted under 35 U.S.C. 154(b) by 276 days.

(21) Appl. No.: 13/873,695

(22) Filed: Apr. 30, 2013

(65) Prior Publication Data

US 2014/0318184 A1    Oct. 30, 2014

(51) Int. Cl.
| | | |
|---|---|---|
| *C03B 17/06* | (2006.01) | |
| *C03B 32/02* | (2006.01) | |
| *C03C 19/00* | (2006.01) | |
| *C03B 40/033* | (2006.01) | |
| *C03B 13/08* | (2006.01) | |

(52) U.S. Cl.
CPC ............... *C03B 32/02* (2013.01); *C03B 13/08* (2013.01); *C03B 17/065* (2013.01); *C03B 40/033* (2013.01); *C03C 19/00* (2013.01); *Y02P 40/57* (2015.11); *Y10T 428/24355* (2015.01)

(58) Field of Classification Search
CPC .......... C03B 18/14; C03B 13/08; C03B 40/00; C03B 40/033; C03B 40/02; C03C 19/00; C03C 17/00; C03C 17/002; C03C 17/04; C03C 17/22

See application file for complete search history.

(56) References Cited

U.S. PATENT DOCUMENTS

| | | | | |
|---|---|---|---|---|
| 1,772,072 | A * | 8/1930 | Drake | ..................... C03B 13/04 |
| | | | | 65/101 |
| 2,992,747 | A * | 7/1961 | Atkeson | ............... B65G 49/069 |
| | | | | 206/449 |
| 3,484,327 | A | 12/1969 | Denman | ........................... 161/1 |
| 3,672,859 | A * | 6/1972 | Classen | .................... C03B 8/14 |
| | | | | 65/61 |
| 3,847,582 | A | 11/1974 | Kozmin | ........................... 65/33 |

(Continued)

OTHER PUBLICATIONS

European Patent Office; International Search Report; Mailing date: Jul. 28, 2014; pp. 1-3.

*Primary Examiner* — Jodi C Franklin
(74) *Attorney, Agent, or Firm* — Kevin M. Johnson (57) ABSTRACT

Provided herein is a method for producing glass-ceramic sheets. The method includes texturing at least one surface of a first glass sheet, and stacking the first glass sheet and a second glass sheet. The first glass sheet and the second glass sheet are stacked so that the textured surface of the first glass sheet contacts a surface of the second glass sheet. The first and second glass sheets are cerammed. After cooling, the cerammed first and second glass sheets are separated. Also provided is a pre-form for producing glass-ceramic sheets. The pre-form includes a first glass sheet having a textured surface, and a second glass sheet contacting the first glass sheet. The textured surface of the first glass sheet is in contact with a surface of the second glass sheet.

14 Claims, 5 Drawing Sheets

(56) References Cited

U.S. PATENT DOCUMENTS

| | | | | |
|---|---|---|---|---|
| 4,746,347 A * | 5/1988 | Sensi | | C03B 18/14 65/182.4 |
| 5,073,181 A * | 12/1991 | Foster | | C03B 40/033 427/154 |
| 5,200,858 A * | 4/1993 | Hagerty | | G02B 3/0087 359/652 |
| 5,769,918 A * | 6/1998 | Burt | | C03B 40/02 65/17.3 |
| 5,788,731 A | 8/1998 | Suzuki et al. | | 65/32.1 |
| 6,030,829 A * | 2/2000 | Dannoux | | C03B 11/06 220/501 |
| 6,374,640 B1 * | 4/2002 | Fotheringham | | C03B 32/00 65/111 |
| 6,544,599 B1 * | 4/2003 | Brown | | C23C 4/12 427/383.1 |
| 6,846,760 B2 * | 1/2005 | Siebers | | C03C 3/085 501/32 |
| 7,201,639 B2 * | 4/2007 | McCaffrey | | B24B 37/0056 29/424 |
| 7,210,579 B2 * | 5/2007 | Fujioka | | B65D 19/385 206/451 |
| 8,015,842 B2 * | 9/2011 | Lautenschlaeger | | C03B 18/02 65/33.1 |
| 8,245,538 B2 * | 8/2012 | Kimura | | C03B 17/064 65/90 |
| 8,713,971 B2 | 5/2014 | Tivey et al. | | |
| 8,713,972 B2 | 5/2014 | Lakota et al. | | |
| 8,826,693 B2 * | 9/2014 | Coppola | | C03B 23/0093 65/36 |
| 9,003,835 B2 | 4/2015 | Lock | | |
| 2002/0117250 A1 * | 8/2002 | Veerasamy | | B32B 17/10036 156/101 |
| 2003/0054736 A1 * | 3/2003 | Hagan | | B24B 9/065 451/44 |
| 2004/0107731 A1 * | 6/2004 | Doehring | | C03B 19/02 65/81 |
| 2004/0237590 A1 * | 12/2004 | Sakoske | | C03B 18/14 65/60.5 |
| 2005/0016214 A1 * | 1/2005 | Hsu | | C03B 13/04 65/33.9 |
| 2005/0078391 A1 * | 4/2005 | Faris | | B08B 17/06 359/894 |
| 2005/0255983 A1 * | 11/2005 | Becker | | C03B 32/02 501/4 |
| 2007/0042889 A1 * | 2/2007 | Apel | | C03B 32/02 501/5 |
| 2008/0164173 A1 * | 7/2008 | Savakus | | B65D 57/00 206/454 |
| 2008/0290082 A1 * | 11/2008 | Tallet | | C03B 13/08 219/452.11 |
| 2009/0038343 A1 * | 2/2009 | Gibson | | B32B 17/10036 65/60.1 |
| 2009/0053534 A1 * | 2/2009 | Prunchak | | B32B 17/10036 428/438 |
| 2009/0100872 A1 * | 4/2009 | Hawtof | | C03B 23/203 65/36 |
| 2009/0162623 A1 * | 6/2009 | Foresti | | B29C 59/046 428/210 |
| 2009/0305020 A1 * | 12/2009 | Kimura | | C03B 17/064 428/220 |
| 2010/0242715 A1 * | 9/2010 | Raichel | | C03B 32/02 89/36.02 |
| 2011/0281078 A1 * | 11/2011 | Schiavoni | | C03B 13/08 428/167 |
| 2012/0108414 A1 * | 5/2012 | Ruedinger | | C03B 32/02 501/32 |
| 2012/0295209 A1 * | 11/2012 | Pierre | | C03B 29/08 432/11 |
| 2013/0133369 A1 * | 5/2013 | Lock | | C03B 13/08 65/60.1 |

* cited by examiner

METHOD FOR REDUCING GLASS-CERAMIC SURFACE ADHESION, AND PRE-FORM FOR THE SAME

BACKGROUND

Field

The present specification generally relates to methods of manufacturing glass-ceramic sheets. More particularly, this specification is directed to methods of manufacturing glass-ceramic sheets including stacking glass sheets having textured surfaces.

Technical Background

Thin glass sheets may be made by a thin-rolled process. To enhance the production capacity, the thin sheets created by the thin-rolled process are often stacked during the ceramming step. Additionally, a shorter ceramming cycle with a higher ceramming temperature may be used to reduce costs and production times associated with the ceramming cycle. The high temperatures used in the ceramming cycle and the number of stacked glass sheets may cause surfaces of the stacked glass sheets to fuse together. The more glass sheets added to the stack, and the higher the ceram temperature used, the stronger the adhesion between the thin glass sheets becomes. Separating the fused glass sheets after the ceramming process may result in breakage and, thus, product loss.

To address the above issues, barrier powders have been applied to the surfaces of the thin glass sheets that are in contact with one another. These barrier powders reduce the amount of fusion that occurs between the thin glass sheets. However, additional process steps are required to apply the barrier powder to the glass sheets before the ceramming process and to remove the barrier powder from the glass-ceramic sheets after the ceramming process. Thus, costs and production time are increased. Further, the barrier powders may leave contaminants in the ceramming chamber.

Accordingly, a need exists for methods of manufacturing glass-ceramic sheets that allows separating stacked glass-ceramic sheets and shorter ceram cycles without adding unnecessary process steps.

SUMMARY

According to one embodiment, a method for producing glass-ceramic sheets is disclosed. The method includes texturing at least one surface of a first glass sheet, and stacking the first glass sheet and a second glass sheet. The first glass sheet and the second glass sheet are stacked so that the textured surface of the first glass sheet contacts a surface of the second glass sheet. The first and second glass sheets are heated, and then cooled to form glass-ceramic sheets. After cooling, the first and second glass-ceramic sheets are separated.

In another embodiment, a pre-form for producing glass-ceramic sheets is disclosed. The pre-form includes a first glass sheet having a textured surface, and a second glass sheet contacting the first glass sheet. The textured surface of the first glass sheet is in contact with a surface of the second glass sheet.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Methods for manufacturing textured glass sheets using precision rolls are described in U.S. patent application Ser. No. 13/687,078, which is incorporated herein by reference in its entirety.

Reference will now be made in detail to embodiments, examples of which are illustrated in the accompanying drawings. Whenever possible, the same reference numerals will be used throughout the drawings to refer to the same or like parts. One embodiment of a high precision glass roll forming apparatus and process for producing very thin, textured glass sheets is schematically illustrated in FIG. 1, and is designated generally throughout by the reference numeral 10.

As used in this description and the appended claims, the term "thin" or "very thin" as used in relation to glass-ceramic sheets means a sheet of glass-ceramic having a thickness of about 1 mm or less, or about 0.8 mm or less, or 0.75 mm or less.

As used in this description and the appended claims, the term "average surface roughness" refers to $R_{RMS}$ average surface roughness unless stated otherwise.

Figure 1:
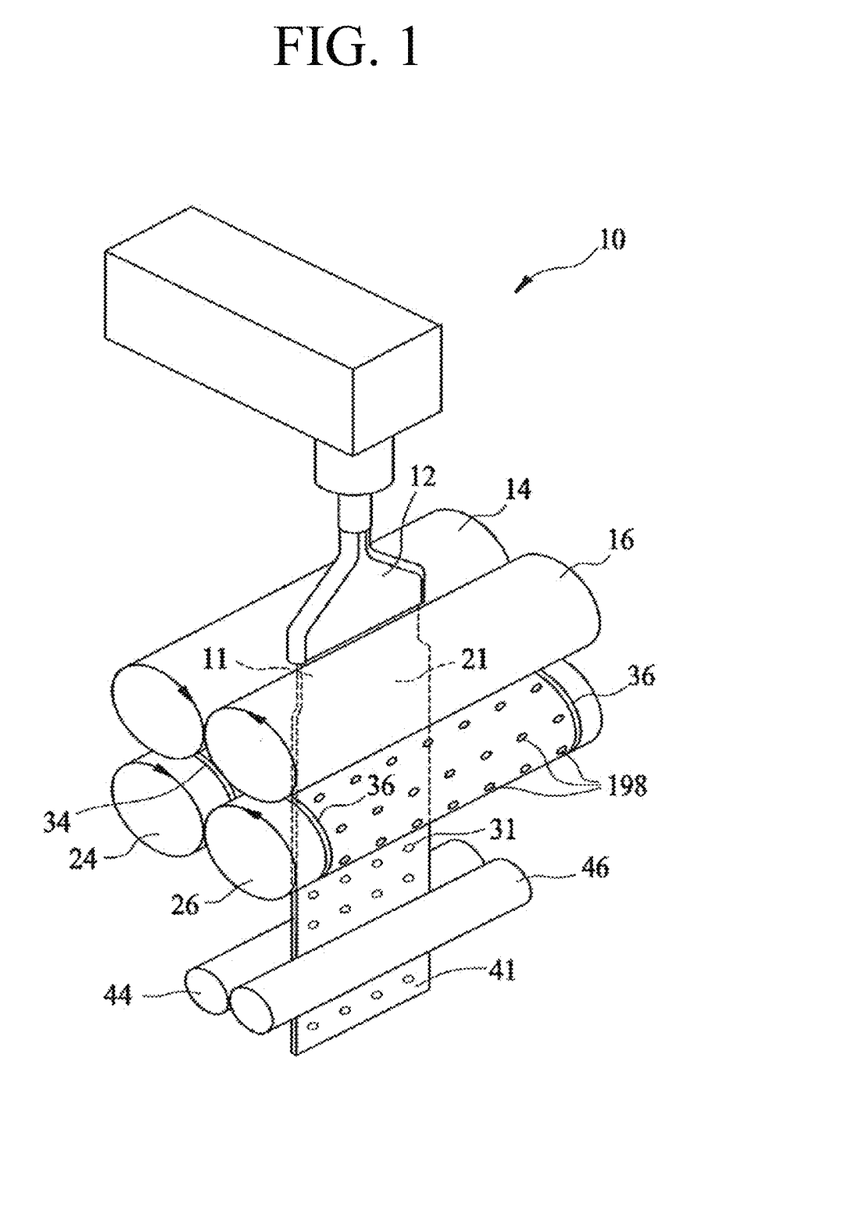
FIG. 1 is a schematic perspective view of one embodiment of a high precision glass roll forming and texturing apparatus and process according to one embodiment hereof.
Figure 2:
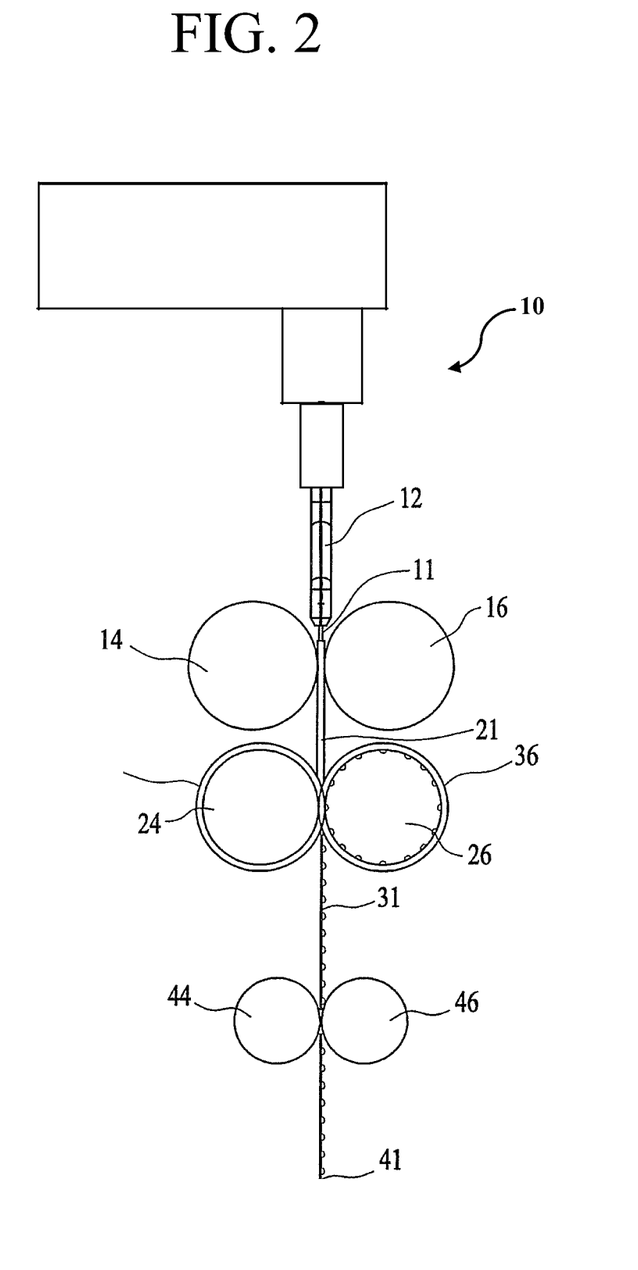
FIG. 2 is a schematic side view of the high precision glass roll forming and texturing apparatus and process of FIG. 1.

Referring now to FIGS. 1 and 2, a stream of molten glass 11 may be delivered, for example, from a fish tail or feed slot 12 to the center of a nip between a first pair of forming rolls 14 and 16. The slot orifice may have wide ranges of widths/lengths and thicknesses. The stream of glass may be delivered to the nip of a first pair of forming rolls 14 and 16 at a glass temperature of about 1000° C. or higher. The first pair of forming rolls may be conventional hot forming rolls that may be temperature controlled at a surface temperature in a range from about 500° C. to about 600° C., or higher, depending on the composition and viscosity of the glass being formed. It should be understood that conventional processes and apparatuses may be used to control the temperature of the rolls. The first/hot forming rolls may flatten, thin, and smoothen the stream of molten glass 11 into a flat sheet of glass 21 having a thickness of about 1.5 mm to about 2 mm, for example.

In embodiments, the forming rolls 14 and 16 may be formed out of steel. In some embodiments, the forming surface of the hot forming rolls may be contoured slightly to compensate for thermal expansion of the hot forming rolls caused by the delivery of the hot glass to the nip of the center portion of the forming rolls. The contour may be tapered or variable such that a central portion of the forming rolls are thinner, e.g. have a smaller outer diameter, than outer or edge portions of the forming rolls, such that the glass sheet 21 exiting the hot forming rolls is slightly thicker in the central region of the glass sheet than at the outer or edge portions, in order to avoid the "dog bone" glass ribbon shape effect where the glass ribbon is formed thicker near the side edges of the ribbon than in the middle. If the glass ribbon is formed thicker in the outer or edge regions of the glass ribbon, then wrinkles or waves may be formed in the glass ribbon when the glass ribbon is sized by the sizing rolls as described hereinafter. It should be understood that the rotational speed and temperature of the forming rolls and the size of the gap between the forming rolls are carefully selected and controlled to produce a glass ribbon 21 with the desired width and thickness.

The glass sheet 21 exiting the hot forming rolls 14 and 16 is then delivered to the center of a nip between a second pair of forming rolls 24 and 26. The second pair of forming rolls 24 and 26 are precision dimensioned sizing rolls that further form and thin the glass sheet 21 to the desired thickness of the glass sheet. In embodiments, the outer surface of at least one of the sizing rolls 26 (e.g. a sizing and texturing roller, or simply texturing roller 26) is textured to impart a texture to a surface of the glass ribbon. The outer surface of the other sizing roller 24 may optionally be textured as well in order to impart a texture to both surfaces of the glass ribbon, or it may be smooth. The sizing and texturing rolls 24 and 26 may be temperature controlled to a relatively cold surface temperature, compared to conventional forming rolls. In embodiments, the temperature of the sizing and texturing rolls 24 and 26 may be from about 100° C. to about 400° C. In embodiments, the temperature of the surface of the sizing and texturing rolls may be as low as the glass composition and process/apparatus configuration allows. The outer glass sizing/texturing surfaces of the cold sizing and texturing rolls may be precision dimensioned cylinders that are formed with size and run out (e.g. the radius and concentricity of the outer sizing surface about the rotational axis of the rolls) having tolerances of no more than +/−0.0125 mm. The outer glass forming surface of the cold sizing and texturing rolls may be formed of or coated with a thermally insulating material. The texture formed in the textured sizing roll(s) and that is imparted to the surface of the glass ribbon may be formed of extremely fine surface texturing patterns with features having dimensions as small as 10 μm to 12 μm. The texture features on the sizing/texturing rolls and on the glass ribbon in FIGS. 1 and 2 are not drawn to scale, but are greatly exaggerated in size for illustrative purposes.

The textured features 198 may be formed using a laser, for example, to engrave the surface of texturing roller 26 using manufacturing techniques widely used in the printing industry to form Anilox rollers. The laser may be employed to engrave a regular, repeatable geometric pattern of textured features 198 on the surface of the rollers, or it may form a random pattern of textured features 198 on the surface of the texturing roller. In various embodiments, the textured features may be all of the same size and geometric shape, or two or more, or even random sized and geometric shapes. The textured features may be arrayed on the surface of the texturing roller in a regular, repeatable pattern or in a varying or even a random pattern. Recessed textured features are primarily illustrated in the drawings as recesses, such as pits or crevices, in the surface of the texturing roller 26 that form correspondingly shaped raised features, such as bumps or ridges, on the surface of the glass ribbon. The texturing features 198 may alternatively be raised features, such as bumps or ridges that form correspondingly shaped recesses, such as pits or crevices, on the surface of the glass ribbon. The textured features 198 may be formed by direct laser engraving, applying arc plasma sprayed ceramic surface coatings, or any other suitable engraving or material removal process such as etching, sand blasting, as well as other surface replication methods. Raised features may be formed on the surface of the texturing roller with any suitable material deposition process. The textured features formed in the texturing roller and that are imparted to the surface of the glass ribbon may be formed of extremely fine surface texturing patterns with features with dimensions as small as 10 μm to 12 μm.

The textured features 198 may take many geometric forms or shapes. For example, textured features may be hexagonal, diamond, or other geometric or even random shapes. In embodiments, the features may be a 60° hexagonal pattern of cells with a concentration of 1200 cells per inch, a cell opening of 18 μm and a wall thickness between cells of 3 μm. In another example, the features may be spaced recesses with differing feature or cell counts that form a surface coverage of from 20% to 100% of the total surface area of the texturing roller surface. In other examples, the textured features may be arrayed in groups of 3 or more closely spaced features or cells, with the groups arrayed in a repeating or random pattern on the surface of the texturing roller. An almost unlimited number of cell patterns can be generated with direct laser engraving technology.

The outer glass forming surface of the cold sizing/texturing rolls may be formed by a ceramic insulating cylinder, sleeve or coating. The insulating cylinder may provide a thermal barrier that minimizes the amount of heat that is transferred from the ribbon of hot molten glass to the cold sizing/texturing rolls. The thermal barrier provided by the insulating cylinder may allow the sizing and texturing rolls to be run at less than 200° C., or even less than 100° C. without cracking or checking the glass sheet or ribbon due to too rapid cooling of the glass. Operating the sizing and texturing rolls at less than 200° C., or less than 100° C., also results in negligible changes in the profile of the outer glass forming surface of the sizing and texturing rolls 24 and 26 due to thermal expansion (during operation the temperature of the sizing and texturing rolls is not increased as much as the temperature of the forming rolls), such that control of the formed ribbon may be achieved solely by the cold roll sizing of the molten glass ribbon by the sizing/texturing rolls with no subsequent finishing operations on the produced glass sheet.

Forming the glass into a relatively thick glass ribbon or sheet of about 1.5 mm to about 2 mm at the forming rolls leaves enough mass of molten glass in the formed glass sheet having sufficient thermal energy in a center of the sheet to reheat the outer regions of the glass sheet that have been cooled by contact with the forming rolls. Such reheating of the outer regions of the glass sheet allows the glass sheet to be optionally drawn and thinned between the forming rolls and the sizing rolls and to be sized and textured at the sizing and texturing rolls.

Precision dimensioned spacer rings 34 and 36 may be mounted near the ends of each sizing and texturing rolls 24 and 26. The spacer rings are precision machined to have a cylindrical outer surface within a tolerance of no more than +/−0.0125 mm. The sizing and texturing rolls may be pressed together such that the spacer rings 34 on sizing roll 24 are contacting and pressing against the spacer rings 36 on sizing and texturing roll 26. In this manner, precision gap control between the sizing and texturing rolls 24 and 26 is reliably achieved, regardless of any thermal expansion of the bearing blocks or support structure. Spacer rings may be optionally used on the hot forming rolls 14 and 16 as well. The formed glass ribbon 21 is further thinned and precision formed by the sizing and texturing rolls 24 and 26 into very thin (for example about 1 mm thick or thinner, 0.8 mm thick or thinner, or 0.75 mm thick or thinner) sized and textured glass ribbon 31 with a thickness within a tolerance of no more than +/−0.025 mm and a desired texture on at least one surface. As is understood in the art, the rotational speed and surface temperature of the sizing and texturing rolls, and the size of the gap between the sizing and texturing rolls are carefully selected and controlled to produce a glass ribbon 31 with the desired width, texture and thickness.

Two or more pairs of sizing rolls (only one pair is illustrated) may be employed in serial fashion, one below the other, if necessary, in order to form a very thin glass sheet with a high precision thickness, as well as for thermal control, guidance and flatness considerations. In this construction, the sizing rolls in the first sizing roll pair may be smooth and the sizing rolls of the second sizing pair may include at least one textured sizing roll for texturing at least one surface of the glass ribbon.

In embodiments, one or more pairs of conventional pulling rolls 44 and 46 may be provided below the sizing and texturing rolls 34 and 36 in order to pull downward on the glass ribbon 31 and generate a slight tension in the glass ribbon 31 in order to stabilize the glass ribbon, stretch the glass ribbon 31, isolate the glass stream 11 and glass ribbon 21 in the glass forming region from downstream processes, maintain flatness of the glass ribbon 31, or further thin the glass ribbon to form glass ribbon 41. The surface material and texture of these pulling rolls must be chosen appropriately to not adversely affect the desired surface finish of the precision formed/dimensioned glass ribbon/sheet 41. The glass ribbon 31 or 41 is then cooled down and delivered to a take-out mechanism, where the glass ribbon is cut into individual glass sheets of the desired size. The take out mechanism may be a travelling anvil for scoring and breaking sheets of glass from the bottom of the traveling sheet of glass and a robotic arm with a Bernoulli chuck for removing the separated glass sheet from the glass forming apparatus, or the glass take out mechanism may be a horizontal conveyor that transports the glass ribbon to downstream glass processing stations, such as glass cutting, finishing (edge and surface), or shaping stations.

The molten glass stream 11 may be fed to the center of the nip of the hot forming rolls 14 and 16 using any suitable glass delivery method. For example, the molten glass may be delivered to the forming rolls in batches from a crucible or a pre-shaped ladle; or the molten glass may be continuously fed to the forming rolls as a stream of glass from a fishtail orifice, slot orifice, fusion forming isopipe, or an extrusion furnace.

Figure 3:
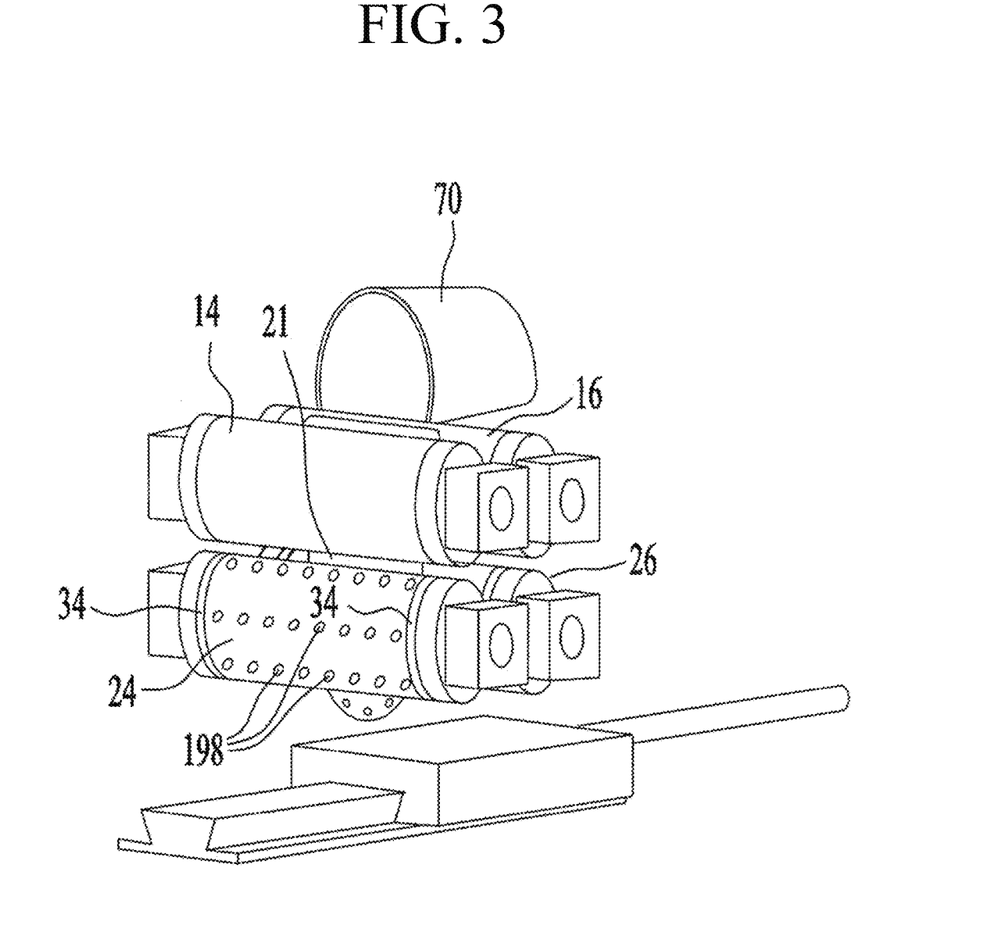
FIG. 3 is a schematic perspective view of an embodiment of the high precision glass roll forming and texturing apparatus of FIG. 1 with a crucible or ladle feed.
Figure 4:
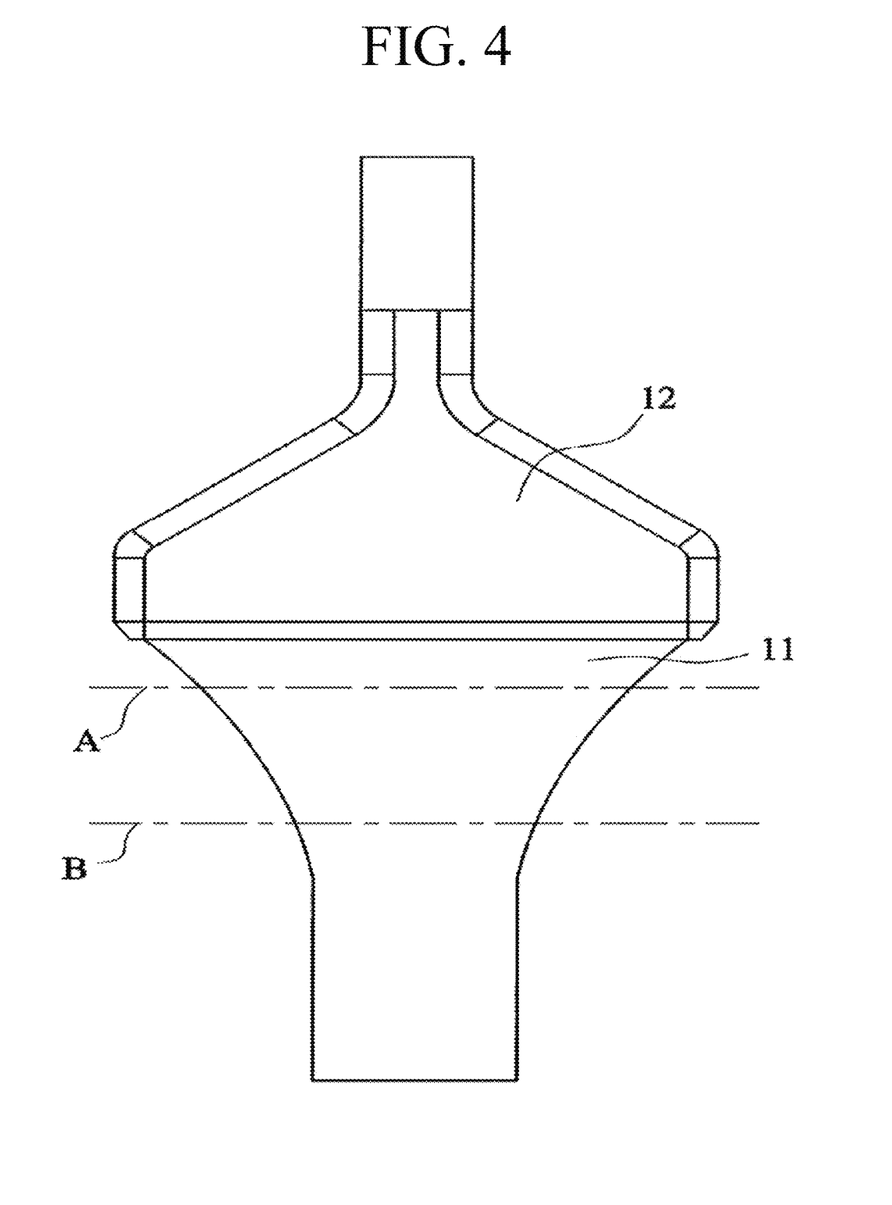
FIG. 4 is a schematic front view illustrating the glass feed from a fish tail slot feed embodiment hereof.

As schematically illustrated in FIG. 3, a ladle or crucible 70 may be employed to feed batches of molten glass into the nip of the hot forming rolls 14 and 16. The ladle 70 is filled with molten glass in a known manner. The ladle of molten glass may then be moved into place above the nip of the hot forming rolls 14 and 16, and the ladle is tipped and the molten glass is poured into the nip of the hot forming rolls 14 and 16. The ladle may be tipped in a controlled manner such that the glass pours from the ladle at a desired rate of flow for forming a desired width ribbon of glass with the forming rolls 14 and 16. Alternatively, depending on the volume of the ladle relative to the length of the forming rolls 14 and 16, the ladle may quickly dump its contents of molten glass onto the nip of the forming rolls 14 and 16, forming a puddle of molten glass on the nip of the forming rolls. Molten glass from the puddle is then drawn down by gravity and the rotating glass forming surface of the forming rolls and formed into a formed glass ribbon 21. However, it may be difficult to control the width of the glass ribbon 21 in such a process where the glass is dumped all at once from the ladle.

By placing the glass feed slot 12 as close to the nip of the forming rolls 14 and 16 as possible, thin glass having a relatively low viscosity at the delivery temperature of about 1000° C. or higher (for example, from about 1000° C. to about 1500° C.) at the nip of the forming rolls 14, 16 may be employed to form glass sheets with the roll forming apparatus described herein. For example, glass-ceramic compositions having a viscosity of about 200 poise, as well as glass-ceramic compositions having a viscosity as high as about 10,000 poise or higher at the delivery temperature may be formed with a prescribed thickness by the precision glass roll forming apparatus as described and illustrated herein. Such low viscosity glass compositions cannot be formed using conventional slot draw and fusion draw processes, because the molten glass stream/ribbon 11, 21, 31 becomes unstable under its own weight and/or the tension applied to the molten glass ribbon in such processes and loses its shape. Also, the width of the glass sheet produced may be maximized by placing the glass feed slot 12 as close to the nip of the forming rolls 14 and 16 as possible, in order to minimize the time that the glass stream 11 has to attenuate before being formed by the forming rolls.

In embodiments, the glass sheets may have thicknesses from about 0.5 mm to about 1.5 mm, or even from about 0.7 mm to about 1.2 mm. In other embodiments, the thickness of the glass sheets may be about 1.0 mm. The width of the glass sheets may be from about 30 mm to about 90 mm, or even from about 40 mm to about 80 mm. In other embodiments, the width of the glass sheets may be from about 50 mm to about 70 mm, or even about 60 mm. The length of the glass sheets may be from about 100 mm to about 500 mm, or even from about 200 mm to about 400 mm. In other embodiments, the length of the glass sheets may be from about 250 mm to about 350 mm, or even about 300 mm. It should be understood that the method disclosed herein may be applicable to glass sheets having other shapes and sizes.

According to embodiments, the glass sheets may have one or more textured surfaces. In embodiments, the average surface roughness of the textured surfaces may be about 1.00 µm or more, or even about 1.02 µm or more. In some embodiments, the average surface roughness of the textured surfaces may be about 1.04 µm or more, or even about 1.06 µm or more. In yet other embodiments, the average surface roughness of the textured surface may be about 1.08 µm or more, or even about 1.10 µm or more.

In embodiments, the average surface roughness of a non-textured glass surface may be about 0.230 µm or less, or even about 0.210 µm or less. In other embodiments, the average surface roughness of the non-textured glass surface may be about 0.200 µm or less, or even 0.190 µm or less. In still other embodiments, the average surface roughness of the non-textured glass surface may be about 0.180 μm or less, or even about 0.170 μm or less.

The formed glass sheets may be stacked prior to a ceram process to increase the number of glass sheets that may be cerammed in the ceram cycle. Within the stack of glass sheets, a surface of a first glass sheet may be in contact with a surface of a second, adjacent glass sheet. In embodiments, the contacted surface of the first glass sheet may be textured and the contacted surface of the second, adjacent glass sheet may not be textured. In other embodiments, the contact surfaces the glass sheet and an adjacent glass sheet may be textured. This stacking may be repeated so that any number of glass sheets in the stack has a textured surface contacting a non-textured or textured surface of an adjacent glass sheet. It should be understood that the number of glass sheets in the stack is not particularly limited.

In embodiments, a difference in average surface roughness between the textured surface of a glass sheet and the average surface roughness of the contact surface of an adjacent glass sheet may be about 0.75 μm or more, or even about 0.85 μm or more. In other embodiments, the difference in average surface roughness between the textured surface of a glass sheet and the average surface roughness of the contact surface of an adjacent glass sheet may be about 0.95 μm or more, about 1.00 μm or more, or even about 1.25 μm or more. In some embodiments, the difference in average surface roughness between the textured surface of a glass sheet and the average surface roughness of the contact surface of an adjacent glass sheet may be about 1.50 μm or more, or about 1.75 μm or more, or even 2.00 μm or more. In still other embodiments, the difference in average surface roughness between the textured surface of a glass sheet and the average surface roughness of the contact surface of an adjacent glass sheet may be about 2.10 μm or more, or even about 2.20 μm or more.

In embodiments where the contacted surface of a glass sheet and the contact surface of an adjacent glass sheet are both textured, the average surface roughness of the contact surface of the first glass sheet and the average surface roughness of the contact surface of the adjacent glass sheet may be the same.

The glass sheets stacked in accordance with the above embodiments may be cerammed, that is, heat treated to produce the desired glass-ceramic product. In embodiments, the ceram cycle may include the following five steps: 1) heating the glass sheets from room temperature to a first temperature at a first heating rate; 2) holding the glass sheets at the first temperature for a predetermined amount of time; 3) heating the glass sheets from the first temperature to a second temperature at a second heating rate; 4) holding the glass sheets at the second temperature for a predetermined amount of time; and 5) cooling the glass sheets from the second temperature to room temperature at a first cooling rate.

In embodiments, the first temperature may be from about 700° C. to about 800° C., or even from about 720° C. to about 780° C. In other embodiments, the first temperature may be from about 740° C. to about 760° C., or even about 750° C. In some embodiments, the first temperature may be about 780° C. In embodiments, the first hold time may be about 90 minutes or more, or even about 105 minutes or more. In other embodiments, the first hold time may be about 115 minutes or more, or even 120 minutes. The second temperature may be from about 950° C. to about 1000° C., or even from about 960° C. to about 990° C. In some embodiments, the second temperature may be about 975° C. In embodiments, the second hold time may be about 150 minutes or more, or even about 180 minutes or more. In other embodiments, the first hold time may be about 220 minutes or more, or even 240 minutes. As used herein, room temperature may be any ambient temperature and may comprise temperatures from about 22° C. to about 27° C. It should be understood that the first and second heating rates and the first cooling rate may vary according to the glass composition and temperatures of the ceram process and are not necessarily limited to the heating and cooling rates below. In embodiments, the first and second heating rates may be from about 250° C./hr to about 350° C./hr, such as about 300° C./hr. In embodiments, the first cooling rate may be from about −250° C./hr to about −350° C./hr, such as about −300° C./hr.

The stacked, glass-ceramic sheets may be separated by any conventional process or apparatus. In embodiments, the glass-ceramic sheets may be separated by applying a force to one or more of the glass-ceramic sheets. In various embodiments, a force may be applied at the interface between two contacted glass-ceramic sheets, such as by a blade or a wedge. In embodiments, the maximum force that separates two contacted glass-ceramic sheets where a contacted surface of a glass-ceramic sheet is textured and a contact surface of an adjacent glass-ceramic sheet is not textured may be less than about 0.5 lb/in, or even less than 0.3 lb/in. In other embodiments, the maximum force that separates two contacted glass-ceramic sheets where a contacted surface of a glass-ceramic sheet is textured and a contact surface of the an adjacent sheet is not textured may be less than about 0.2 lb/in, less than about 0.1 lb/in, or even about 0.0 lb/in.

In embodiments, the maximum force that separates two contacted glass-ceramic sheets where a contacted surface of the first glass-ceramic sheet and a contacted surface of the second sheet are textured may be about 9.5 lb/in or less, or even about 9.0 lb/in or less. In some embodiments, the maximum force that separates two contacted glass-ceramic sheets where a contacted surface of the first glass-ceramic sheet and a contacted surface of the second sheet are textured may be about 8.5 lb/in or less, or even about 8.0 lb/in or less. In some embodiments, the maximum force that separates two contacted glass-ceramic sheets where a contacted surface of the first glass-ceramic sheet and a contacted surface of the second sheet are textured may be about 9.3 lb/in.

According to various embodiments of this disclosure, a pre-form of stacked glass sheets for producing glass-ceramic sheets is provided. The pre-form may include at least a first glass sheet having a textured surface as described in detail above, and a second glass sheet with a surface that is in contact with the textured surface of the first glass sheet. In embodiments, the surface of the second glass sheet in contact with the textured surface of the first glass sheet may be textured. In other embodiments, the surface of the second glass sheet in contact with the textured surface of the first glass sheet may not be textured.

EXAMPLES

Embodiments will be further clarified by the following examples.

Example 1

Three glass sheets were prepared using a precision roll without texturing. These three glass sheets had a surface with an average surface roughness of 0.102 μm. Three additional glass sheets were prepared using textured precision rolls as described herein. These three glass sheets had a surface with an average surface roughness of 1.080 μm. The glass sheets were 1 mm thick, 60 mm wide, and 300 mm long.

Sample 1 was made by contacting a non-textured surface of a glass sheet having an average surface roughness of 0.102 μm and a textured surface of a glass sheet having an average surface roughness of 1.080 μm. Sample 2 was prepared by contacting two textured glass sheet surfaces having average surface roughness of 1.080 μm. Sample 3 was prepared by contacting two non-textured glass sheet surfaces having average surface roughness of 0.102 μm.

Each of Samples 1-3 were subjected to a ceram process having the following cycle: 1) heating from 25° C. to 780° C. at a heating rate of 300° C./hr; 2) holding at 780° C. for two hours; 3) heating from 780° C. to 975° C. at a heating rate of 300° C./hr; 4) holding at 975° C. for four hours; and 5) cooling from 975° C. to 25° C. at a cooling rate of 300° C./hr.

Figure 5:
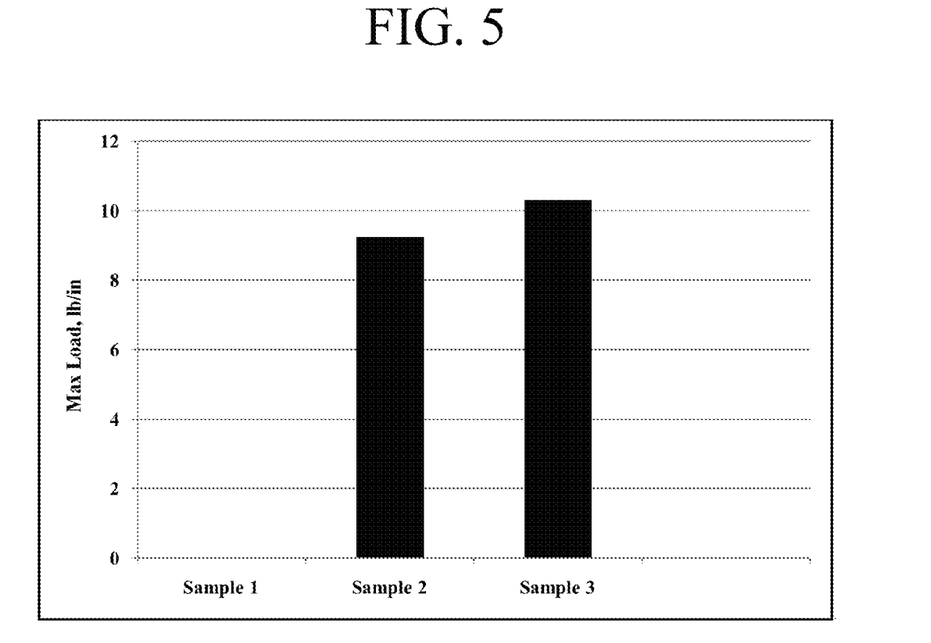
FIG. 5 is a bar graph showing the maximum load that separates the glass-ceramic sheets of Samples 1-3.
Figure 6:
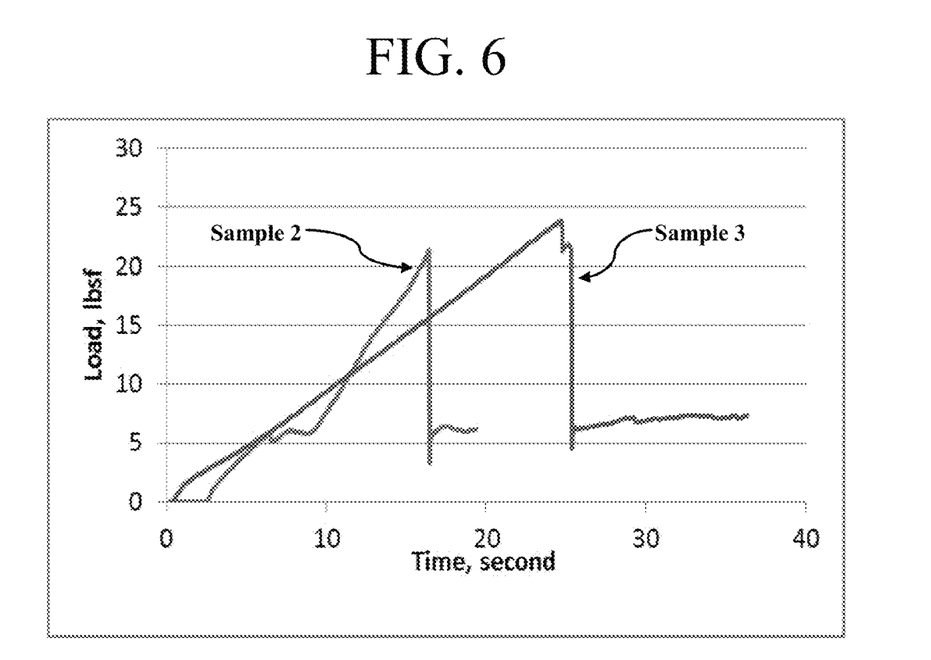
FIG. 6 is a plot graph showing load versus time that separates the glass-ceramic sheets of Samples 2 and 3.

After the ceram cycle, each sample was subjected to a force applied by an Instron 442 loading frame, manufactured by Instron, with a wedge at the interface between the glass-ceramic sheets. The force was increased until the glass-ceramic sheets separated. The results from the separation test are shown in FIGS. 5 and 6. As indicated in FIG. 5, Sample 1 did not require an application of any force to separate the glass-ceramic sheets; 9.24 lb/in of force separated the glass-ceramic sheets in Sample 2; and 10.31 lb/in of force separated the glass-ceramic sheets of Sample 3. As indicated in FIG. 6, the time required to separate the glass-ceramic sheets of Sample 2 was significantly less than the time required to separate the glass-ceramic sheets of Sample 3. A minimal amount of time was required to separate the glass-ceramic sheets of Sample 1 and, thus, it is not shown in FIG. 6.

From this Example, it can be seen that surface adhesion between glass-ceramic sheets after a ceram process may be minimized where the surface of a first glass sheet is textured and the surface of an adjacent glass sheet in contact with the textured surface of the first glass sheet is not textured. Also, surface adhesion between glass sheets after a ceram process may be lower when the surface of a first glass sheet is textured and the surface of an adjacent glass sheet in contact with the textured surface of the first glass sheet is also textured.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for producing glass-ceramic sheets, comprising:
   texturing at least one surface of a first glass sheet to form a textured surface comprising a pattern of textured features imparted to the at least one surface by exposing the at least one surface to a textured roller;
   stacking the first glass sheet and a second glass sheet wherein the pattern of textured features of the textured surface of the first glass sheet contacts a surface of the second glass sheet that is adjacent to the textured surface of the first glass sheet;
   ceramming the first glass sheet and the second glass sheet;
   separating the first cerammed glass sheet and the second cerammed glass sheet.

2. The method of claim 1, wherein a difference between an average surface roughness of the textured surface of the first glass sheet and an average surface roughness of the surface of the second glass sheet is about 0.85 μm or more.

3. The method of claim 2, wherein the difference between the average surface roughness of the textured surface of the first glass sheet and the average surface roughness of the surface of the second glass sheet is about 2.00 μm or more.

4. The method of claim 1, wherein the surface of the second glass sheet is not textured.

5. The method of claim 1, wherein an average surface roughness of the textured surface of the first glass sheet is about 1.00 μm or more.

6. The method of claim 1, wherein an average surface roughness of the surface of the second glass sheet is about 0.230 μm or less.

7. The method of claim 1, wherein the surface of the second glass sheet is textured.

8. The method of claim 7, wherein an average surface roughness of the textured surface of the first glass sheet and an average surface roughness of the surface of the second glass sheet are about 1.00 μm or more.

9. The method of claim 1, wherein an amount of force that separates the first cerammed glass sheet from the second cerammed glass sheet is less than about 0.50 lb/in.

10. The method of claim 7, wherein an amount of force that separates the first cerammed glass sheet from the second cerammed glass sheet is about 9.50 lb/in or less.

11. The method of claim 1, wherein the ceramming step comprises:
    heating the glass sheets from room temperature to a first temperature at a first heating rate;
    holding the glass sheets at the first temperature for a predetermined amount of time;
    heating the glass sheets from the first temperature to a second temperature at a second heating rate;
    holding the glass sheets at the second temperature for a predetermined amount of time; and
    cooling the glass sheets from the second temperature to room temperature at a first cooling rate.

12. The method of claim 11, wherein a maximum temperature of the ceramming step is from about 900° C. to about 1,000° C.

13. The method of claim 1, wherein the glass sheets are from about 0.5 mm to about 1.5 mm thick, from about 30 mm to about 90 mm wide, and from about 100 mm to about 500 mm long.

14. The method of claim 1, wherein the first and second glass sheets are formed by a roll-forming process.

* * * * *